US010499286B2

(12) United States Patent
Obaidi et al.

(10) Patent No.: US 10,499,286 B2
(45) Date of Patent: *Dec. 3, 2019

(54) MOBILE DEVICE HOTSPOT SECURE PUBLIC PEER-TO-PEER SHARING

(71) Applicant: T-Mobile USA, Inc., Bellevue, WA (US)

(72) Inventors: Ahmad Arash Obaidi, San Ramon, CA (US); Eric W. Yocam, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/959,761

(22) Filed: Apr. 23, 2018

(65) Prior Publication Data

US 2018/0242199 A1    Aug. 23, 2018

Related U.S. Application Data

(63) Continuation of application No. 14/728,616, filed on Jun. 2, 2015, now Pat. No. 9,955,384.

(51) Int. Cl.
| | | |
|---|---|---|
| *H04W 28/20* | (2009.01) | |
| *H04L 12/24* | (2006.01) | |
| *H04W 12/08* | (2009.01) | |
| *H04W 16/14* | (2009.01) | |
| *H04W 76/15* | (2018.01) | |
| *H04W 76/16* | (2018.01) | |
| *H04W 88/04* | (2009.01) | |

(52) U.S. Cl.
CPC ......... *H04W 28/20* (2013.01); *H04L 41/0896* (2013.01); *H04W 12/08* (2013.01);

(Continued)

(58) Field of Classification Search
CPC ..... H04W 16/14; H04W 28/20; H04W 84/18; H04W 28/16; H04W 76/02;

(Continued)

(56) References Cited

U.S. PATENT DOCUMENTS 9,955,384 B2 * 4/2018 Obaidi ................. H04W 12/08
2006/0221915 A1   10/2006 Gatta et al.

(Continued)

OTHER PUBLICATIONS

Office action for U.S. Appl. No. 14/728,616, dated Dec. 1, 2016, Obaidi et al., "Mobile Device Hotspot Secure Public Peer-to-Peer Sharing," 21 pages.

(Continued)

*Primary Examiner* — Magdi Elhag
(74) *Attorney, Agent, or Firm* — Lee & Hayes, P.C.

(57) ABSTRACT

Systems and methods for allowing a user to control sharing of network bandwidth in a peer-to-peer environment are described herein. An example telecommunications device includes a user interface device, a processor and a memory device. The telecommunications device identifies one or more time parameters related to bandwidth sharing based on a first operation of the user interface device and identifies one or more bandwidth parameters related to bandwidth sharing based on a second operation of the user interface device. The telecommunications device allows one or more other devices access to one or more networks via one of the telecommunications device or a second device associated with the user, based at least on the identified one or more time parameters and the one or more bandwidth parameters.

20 Claims, 7 Drawing Sheets

(52) U.S. Cl.
CPC ........... *H04W 16/14* (2013.01); *H04W 76/15* (2018.02); *H04W 76/16* (2018.02); *H04W 88/04* (2013.01)

(58) Field of Classification Search
CPC ............. H04W 72/0406; H04W 8/005; H04W 76/021; H04W 40/02; H04W 72/02; H04L 41/0896; H04L 65/403; H04L 5/0039; H04L 5/0091; H04L 5/0035; H04L 5/0037

See application file for complete search history.

(56) References Cited

U.S. PATENT DOCUMENTS

| | | |
|---|---|---|
| 2008/0025723 A1 | 1/2008 | Mayer et al. |
| 2012/0054344 A1 | 3/2012 | Udani |
| 2012/0054355 A1 | 3/2012 | Arrasvuori et al. |
| 2012/0096132 A1 | 4/2012 | Lim et al. |
| 2016/0095017 A1 | 3/2016 | Ely et al. |
| 2016/0105846 A1 | 4/2016 | Anderson et al. |
| 2016/0360410 A1 | 12/2016 | Obaidi et al. |
| 2019/0045401 A1* | 2/2019 | Zhang .................. H04L 47/765 |

OTHER PUBLICATIONS

Office action for U.S. Appl. No. 14/728,616, dated Apr. 7, 2017, Obaidi et al., "Mobile Device Hotspot Secure Public Peer-to-Peer Sharing," 26 pages.

Office action for U.S. Appl. No. 14/728,616, dated May 18, 2016, Obaidi et al., "Mobile Device Hotspot Secure Public Peer-to-Peer Sharing," 16 pages.

Office Action for U.S. Appl. No. 14/728,616, dated Sep. 26, 2017, Obaidi, "Mobile Device Hotspot Secure Public Peer-to-Peer Sharing," 28 pages.

* cited by examiner

US 10,499,286 B2

MOBILE DEVICE HOTSPOT SECURE PUBLIC PEER-TO-PEER SHARING

This application is a continuation of and claims priority to U.S. patent application Ser. No. 14/728,616, filed on Jun. 2, 2015, the disclosure of which is incorporated by reference herein.

BACKGROUND

"Tethering" refers to connecting one device to another. For example, tethering allows sharing a network connection of a host/client device with another device. Certain host/client devices (or "hotspots") connected to a network, such as the Internet, can permit other preconfigured devices to share the network connection by connecting to the hotspot. For example, a smartphone with Internet access can broadcast a WiFi signal that permits another device, such as a tablet computer, to connect to the smartphone over WiFi in order to obtain Internet access. The tablet computer, however, may use as much bandwidth as the smartphone makes available. Thus, the other device may not leave any available bandwidth for the host/client device, because access is either on or off.

BRIEF DESCRIPTION OF THE DRAWINGS

The detailed description is set forth with reference to the accompanying figures. In the figures, the leftmost digit of a reference number identifies the figure in which the reference number first appears. The use of the same reference numbers in different figures indicates similar or identical items or features.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As noted above, tethering refers to connecting one device to another. For example, tethering allows the sharing of a network connection of a first client device with a second client device. For example, a smartphone with Internet access, via a cellular telecommunications system or via an Internet provider, can broadcast a WiFi signal that permits another device, such as a tablet computer, to connect to the smartphone over WiFi (or Bluetooth® or some other wired or wireless connection) in order to obtain Internet access. The smartphone is set by the user/owner to control to whom, when, and how much access is provided to other devices.

Based on the entered information, the first client device then sends the appropriate network access information to the second client device requesting access via a peer-to-peer connection. The second client device uses the network access information to connect (e.g., WiFi) via the first client device in order to obtain Internet access.

In various implementations, the technology facilitates a user of a client device to inform a remote server of network bandwidth that the user desires to donate. The user identifies parameters associated with the donation and in return the user receives a credit and/or a reward. The credit or reward may be monetary credit, additional minutes or data or coupons or other reward for other merchandise.

Various examples will now be described. The following description provides certain specific details for a thorough understanding and enabling description of these examples. The terminology used below is to be interpreted in its broadest reasonable manner, even though it is being used in conjunction with a detailed description of certain specific examples. Indeed, certain terms may even be emphasized below; however, any terminology intended to be interpreted in any restricted manner will be overtly and specifically defined as such in this Detailed Description section.

Example System

Figure 1:
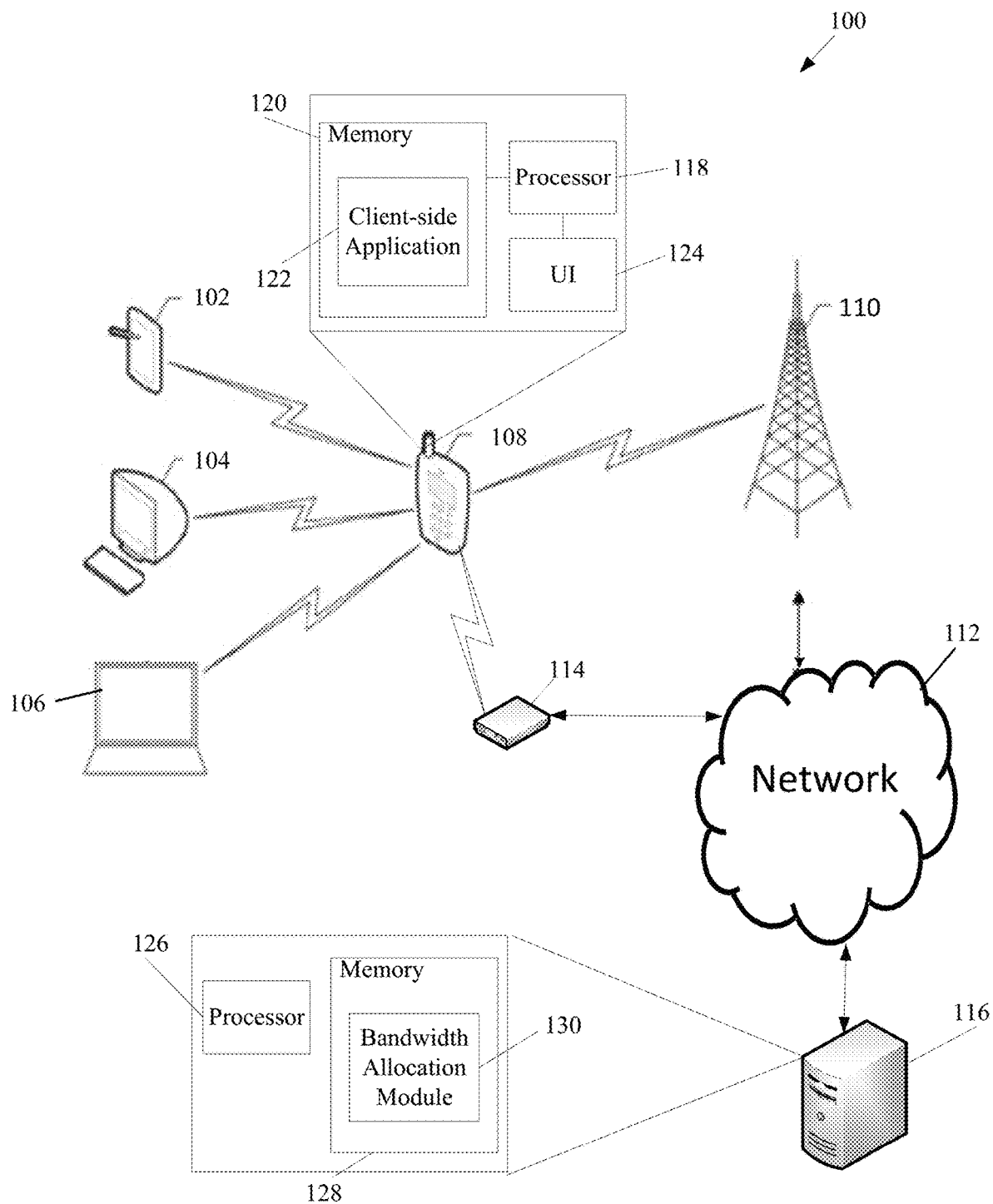
FIG. 1 illustrates a block diagram of an example system formed in accordance with various implementations.

FIG. 1 illustrates an example of a network environment that can provide network access to a client device associated with a user's account and other proximate devices. A network environment 100 includes an electronic device (hereinafter "client device 108"), other electronic devices (hereinafter "user devices 102-106"), network 112, devices used for connecting to network 112 (e.g., tower station 110 of a telecommunications system and a modem 114), and server 116 (optional).

Client device 108 includes one or more processors 118, memory 120 for storing client-side application 122, and one or more user interface (UI) devices 124 (e.g., keyboard, touchscreen display, mouse, etc.). Client-side application 122 is executable by processor 118. UI device 124 presents a graphical user interface generated by processor 118 executing client-side application 122.

Client device 108 and user devices 102-106 can be computing devices such as laptop or desktop computers, smartphones, PDAs, portable media players, tablet computers, or other appropriate computing devices. In the example of FIG. 1, client device 108 is depicted as a smartphone, and user devices 102-106 are depicted as a personal data assistant (PDA), a desktop computer, and a laptop computer, respectively.

Sever 116 includes one or more processor(s) 126 and memory 128. Processor 126 executes computer instructions stored in memory 128, for example, a bandwidth allocation module 130. Users can interact with the bandwidth allocation module 130, hosted by server 116, using client device 108 for accessing a webpage or some other graphical user interface produced by server 116. Alternatively, or in addition, the users can interact with the bandwidth allocation application using any of user devices 102-106, via separate network access (not shown).

In example aspects, network 112 is a wide-area network (e.g., the Internet). Communications between any of user devices 102-106, client device 108, and/or server 116 can be facilitated through a communication protocol, such as hypertext transfer protocol (HTTP). Other communication protocols can also be facilitated for some or all communication between user devices 102-106, client device 108, and/or server 116, including for example, extensible messaging and presence protocol (XMPP) communication.

Client device 108 can include a communication component (e.g., radio baseband processor) (not shown), which receives messages from and sends messages to network 112 via devices, such as tower station 110 and modem 114. Other devices may be used for accessing network 112. The communication component can correspond to a single component, or to multiple components. For example, the communication component is configured in accordance with one or more of global system for mobile communication (GSM), general packet radio services (GPRS) standards, enhanced data GSM environment (EDGE), universal mobile telecommunications service (UMTS), or any other suitable standard. The wireless link connecting the communication component with network 112 represents one or more different radio frequency (RF) channels, for example, operating according to defined protocols specified for GSM, GPRS, EDGE, UMTS, or optionally other network communications. With some network protocols, these channels are capable of supporting both circuit-switched voice communications and packet-switched data communications.

Other wireless networks can also be associated with client device 108. The different types of wireless networks that can be employed include, for example, data-centric wireless networks, voice-centric wireless networks, and dual-mode networks that can support both voice and data communications over the same physical base stations. Combined dual-mode networks include, but are not limited to, code division multiple access (CDMA) or CDMA2000 networks, GSM/GPRS networks, third-generation (3G) networks like EDGE, HSPA, HSPA+, EVDO and UMTS, or fourth-generation (4G) networks, such as LTE and LTE Advanced. An example of a data-centric network includes WiFi 802.11 communication systems. Examples of voice-centric data networks include personal communication systems (PCS) networks like GSM and time division multiple access (TDMA) systems. The communication component of client device 108 can provide for wireless local area network (WLAN) communication, and can operate in accordance with a known network protocol such as one or more of the 802.11 family of standards developed by IEEE through modem 114.

In various implementations, processor 118 may be implemented by a single processor on a single computing device, by multiple processors on a single computing device, or by multiple processors on multiple computing devices.

The memory devices 120 or 128 may be any one or a combination of storage devices (e.g., RAM, flash memory, or other memory devices). The memory devices 120 or 128 may contain data and computer-executable instructions, which may be executed by the associated processors 118 or 126. The data and computer-executable instructions may implement operating systems and application programming interfaces (APIs) for interfacing with the operating systems, or other libraries, such as may be provided or compiled by software development toolkits (SDKs). APIs and SDKs facilitate the development and maintenance of software or firmware widgets, applications, and other code. An operating system contained in the memory devices 120 or 128 may include one that is open to third-party application development (i.e., has APIs available for independent software vendors to utilize when writing code, examples including Apple iOS, Google Android™, Microsoft Windows® phone or Windows® Mobile, and Symbian™ operating systems), or one that is not open to third-party application development.

In various implementations, portions of the computer-executable instructions facilitate interactions between client device 108 and server 116. The UI device 124 may present a graphical user interface (GUI), which may provide functionality to assist the user to perform the entry and management of bandwidth allocation parameters/information. The client-side application 122 provides the GUI and facilitates communicating with server 116 and provides functionality relating to server 116.

As can be seen in FIG. 1, client device 108 can operate as a router for a number of other devices (e.g., user devices 102-106) configured to communicate wirelessly with client device 108. Alternatively, or in addition, client device 108 and one or more other communication or data-processing devices can be configured to automatically set up an ad hoc network, for example, a Wi-Fi Direct or another suitable protocol. In the example of FIG. 1, each of user devices 102-106 communicates with client device 108 over a wireless link.

Although each of user devices 102-106 is shown communicating with client device 108 over a wireless link, one or more of user devices 102-106 can be connected to client device 108 over a fixed connection, such as via a data port. Given space constraints, client device 108 can have limited data ports. User devices 102-106 (e.g., laptop 106) can be provided with a number of data ports to permit the other client devices (e.g., PDA 102, desktop computer 104) to be connected over a fixed connection. In addition, user devices 102-106 can be configured to enter into ad hoc networks with another one of these devices.

Client device 108 is in communication with network 112. Client device 108 can thus have access to data services over a data-centric network, and, through its operation as a router for user devices 102-106, can provide these other devices with connectivity to the Internet or another wide-area network. As used herein, operation in this mode is referred to as providing a "hotspot" for user devices 102-106. When one or more of user devices 102-106 is within the vicinity of client device 108, while client device 108 is operating as a hotspot, the one or more user devices 102-106 can connect to client device 108, according to parameters set by the user of client device 108, and thereby access the wide-area network (e.g., the Internet).

Client-side application 122 allows the user of client device 108 to identify bandwidth allocation/sharing parameters. Client-side application 122 provides a GUI at user interface 124. The GUI provides adjustable settings for establishing client device 108 as a secure mobile device hotspot (Wifi or cell) by configuring public peer-to-peer (P2P) sharing with one or more of user devices 102-106 based on a bandwidth parameter, a number of public users parameter, or a time period parameter.

In an example implementation, client device 108 is a mobile device. The mobile device's owner, interacting with the GUI, configures his or her mobile device to allow a portion of a Wifi or cell hotspot to be securely shared with other mobile devices in near proximity. The mobile device's owner can set an amount of available network bandwidth to share (i.e., bandwidth parameter). The owner may also set a threshold on the number of user devices 102-106 to share with (i.e., number of public users parameter). The owner may also identify one or more time periods when sharing is available (i.e., time period parameter).

In another example implementation, the owner associates a percentage of the amount of bandwidth to share with a specific other device and the time period to share with the other device. For example, an owner can have different parameters assigned to different devices in a house, thus being able to provide different quality of service (QoS) to different devices.

Example Processes of the System

Some example processes using the system described above will now be provided. These are only examples and many other examples are, of course, possible. Further, based on such examples, one of ordinary skill in the art will appreciate general features of the present system to allow a mobile device to share network access with other devices.

Figure 2:
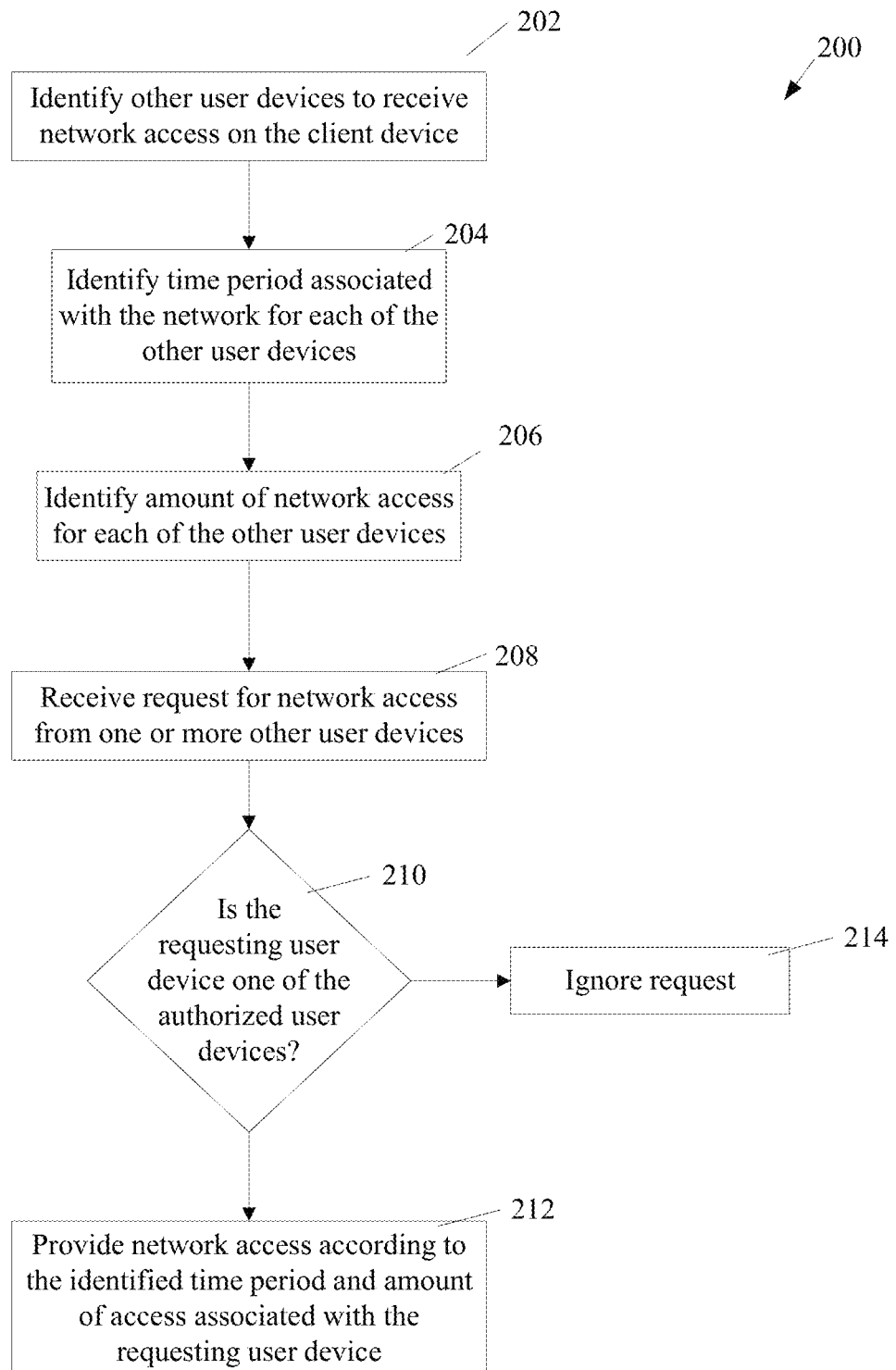
FIG. 2 shows a flow diagram of an example process performed at a user device.

FIG. 2 illustrates an example process 200 performed by client device 108. First, at a block 202, client device 108 is used to identify other users' devices to receive network access by receiving a pass-through connection using client device 108, another device associated with the user/owner of the client device 108, or a service associated with client device 108. The user can perform this identification using UI device 124, such as a display presenting a GUI (e.g., FIG. 4B). Other mechanisms may be used for performing this identification, for example, user interface 124 may include a microphone and voice-activated components.

At a block 204, client device 108, UI device 124, and GUI may be used to identify a time period (window) where pass-through network access is available for the identified user's device(s). The identified time period may be broken down into any denomination, for example, month, day, hour, minute. An example is shown in FIG. 4C. Thus, the time period may be an amount of time within a window (for example, 1 hour/day) or may be a specific window of time (for example, Mondays between 3:00 p.m. and 4:30 p.m.). This time parameter may be not designated, thus being available at any time.

At a block 206, client device 108, UI device 124, and GUI may be used to identify an amount of network access to share with any or all of the identified user devices. An example of a GUI for performing this identification is shown in FIG. 4C. The user can specify a particular amount of bandwidth to share with a specified one of the identified users or the identified amount of bandwidth to share is made available to all other user devices. The identified amount of bandwidth to share may be a percentage of the bandwidth available to client device 108 or may be a capped amount of data transmitted to the user devices 102-106 or transmitted from the user devices 102-106.

As shown in block 208, client device 108 receives a request for network access from one or more other users' devices. A user device 102-106 establishes a communication path with client device 108. This communication path can take on many forms, as previously described. For example, client device 108 may be presented on a list of available Wi-Fi networks at the user device 102-106. The communication path is established upon the user of user devices 102-106 selecting client device 108 from the list.

Then, at a decision block 210, client device 108 determines whether the user device attempting to establish a communication path is one of the user devices previously identified by client device 108. Processor 118, executing client-side application 122, would compare identification information associated with the requesting user device with identification information stored when the user device identification occurred. If the requesting user device is identified as an authorized user device, then, at a block 212, the requesting user device is allowed network (Internet) access using radio baseband components of client device 108. If the requesting user device is not identified as an authorized user device, then, at a block 214, the request from the requesting user device is ignored or a message is returned to the requesting user device indicating that access is not allowed.

Figure 3:
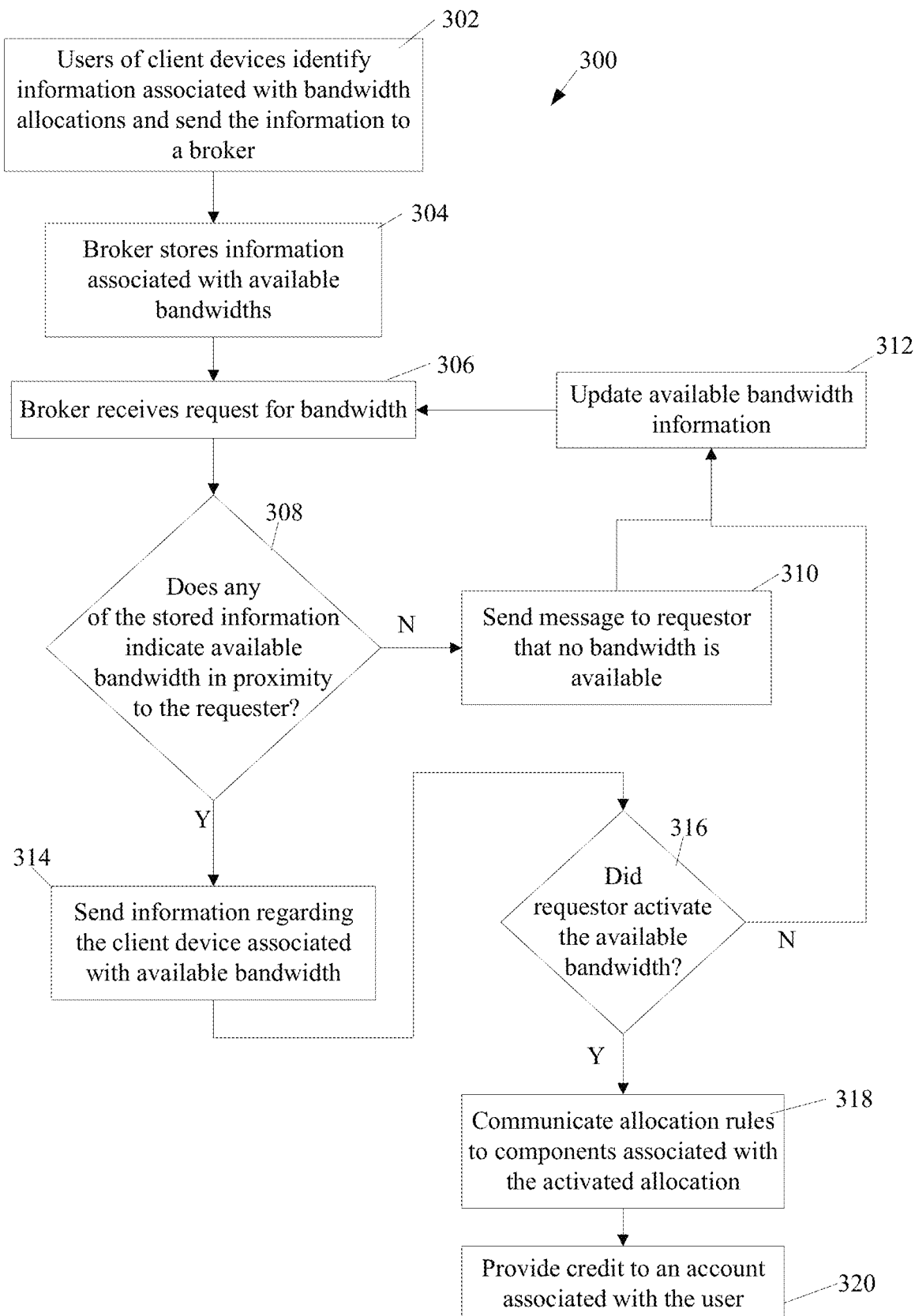
FIG. 3 shows a flow diagram of an example process performed at a network device.

FIG. 3 illustrates an example process performed over the system 100, shown in FIG. 1. First, at a block 302, users of client devices identify information associated with the bandwidth that they desire to allocate/donate. The client device 108 then sends the information to a broker (e.g., server 116 or service provider). The identified information may also include identification information, account information of the user of client device 108, and/or current location information of client device 108.

At a block 304, the broker stores the received information associated with available bandwidth allocations. The broker may provide the stored information in any of a number of different searchable database formats. For example, the stored information may be presented on a map provided by a third-party application.

Then, at a block 306, the broker receives a request for bandwidth allocated by one or more client devices 108 from a user device. The user of the user device may make a request for bandwidth from the broker. This request may be an email, phone call, SMS message or other comparable forms of communication. The request may be a request for an allocation from a specific client device included in the stored information with the broker. The request may be a request for bandwidth that is blind to the client device 108. The request may include location information of the requesting device, an amount of data, and/or a quality of service (QoS) level.

For example, a spectator at a football game has reached the data limit on their device. Once they may a request for more data from the broker, the broker provides information to perform a wireless connection with other devices in their section. The user of those other devices had previously identified that their devices were available for bandwidth sharing. The device of the spectator gets accesses the bandwidth from the other devices based on the provided information from the broker. The broker then applies a credit if applicable to the account associated with the users of those other devices depending upon how much of their bandwidth was used by the spectator's device.

Then, at a decision block 308, the broker determines if the received request can be satisfied. The broker determines if the parameters of the request can be matched by the client device(s) that are allocating the access. If the request cannot be satisfied, then, at block 310, the broker transmits a message to the requester that the service cannot be satisfied. The process 300 then updates available allocated bandwidth information at a block 312 and returns to block 306.

If the broker determines that the request can be satisfied, then, at a block 314, the broker transmits information regarding the client device that can satisfy the request based on a location match between the requesting device and the client device and a match between the amount of bandwidth requested by the requesting device and the amount of bandwidth allocated by the client device.

If the broker determines that a combination of allocations from multiple client devices can satisfy the request, then information for those multiple client devices is sent to the requesting device. An application on the requesting user device may control data transmission and reception when using bandwidth from multiple client devices. This may be accomplished by allocating packets of information to the various channels for the multiple connected devices.

Another component may be located at server 116 for combining or splitting packets of information that were sent to or received from the user device via the multiple connected devices.

If, at a decision block 316, the requesting device fails to activate an available bandwidth allocation within a threshold period of time from acceptance of the request, then the process 300 proceeds to block 312 for updating. If the requesting device does activate an available bandwidth allocation, then, at a block 318, the broker communicates allocation rules to components of the network associated with the allocating client device. Then, at a block 320, the broker provides a credit to an account associated with the user(s) or a reward to the user(s) associated with the device sharing its bandwidth. The credit may be in any format, e.g., bandwidth credit, minutes credit, etc. The reward may be in any format, e.g., coupons, refunds, etc.

The allocation rules may be implemented as functional elements in a third-generation partnership project's (3GPP's) policing and charging control (PCC) framework. For example, the bandwidth allocation rules are communicated to all nodes of an IP network (e.g., user equipment (UE), policy and charging rules function (PCRF), eNodeB, signaling gateway (SGW)).

The allocation rules may include the following rules:
- a rule about how to respond when the bandwidth provider is about to drop connection and needs to communicate with the broker;
- a rule about how to respond when a broker needs to hand off to another bandwidth provider when a particular bandwidth provider is about to drop connection;
- a rule to protect when one or more bandwidth providers suddenly drop a connection;
- a rule for how to respond when a maximum limit on number of bandwidth providers has been or is about to be attained;
- a rule of how a broker should respond when some bandwidth providers are providing cellular and other bandwidth providers are providing WiFi;
- a rule of how to respond when a bandwidth provider provides a specific amount of bandwidth and simultaneously hosts a hotspot;
- a rule of how to handle an e911 call when the broker is also handling other bandwidth providers; and
- a rule of how to handle offloading broker duties when a requesting device is near a WiFi access point.

Figure 4A:
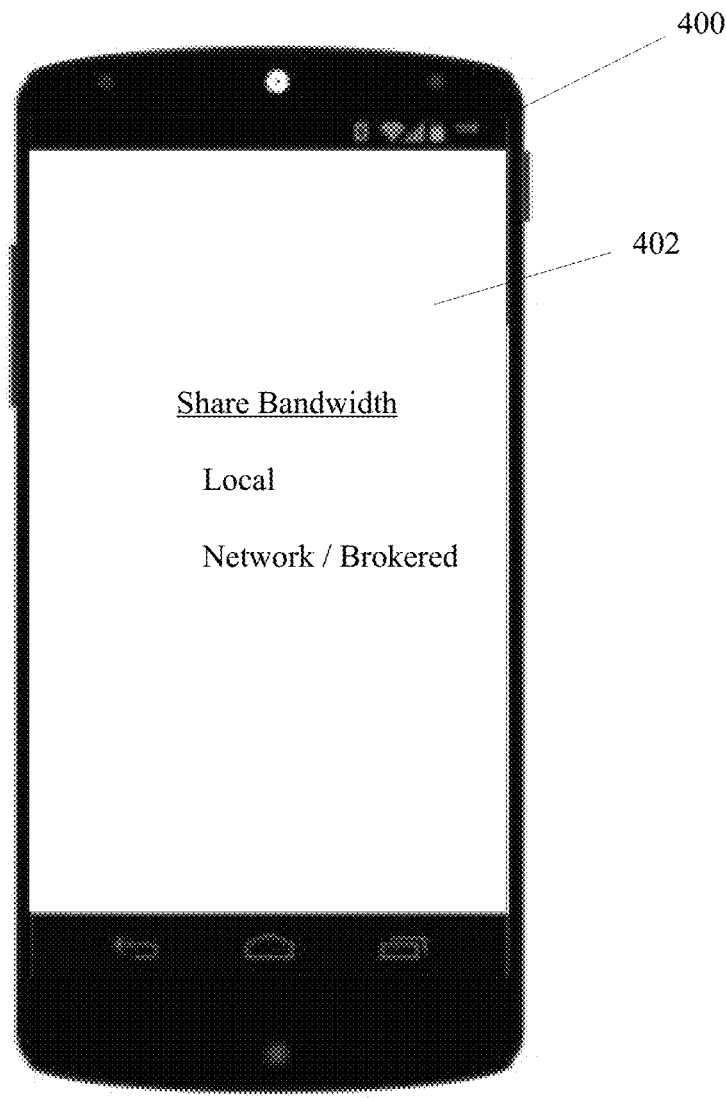
FIGS. 4A-4D show a user's mobile device presenting example screenshots for controlling bandwidth allocation to other devices.
Figure 4B:
Figure 4C:
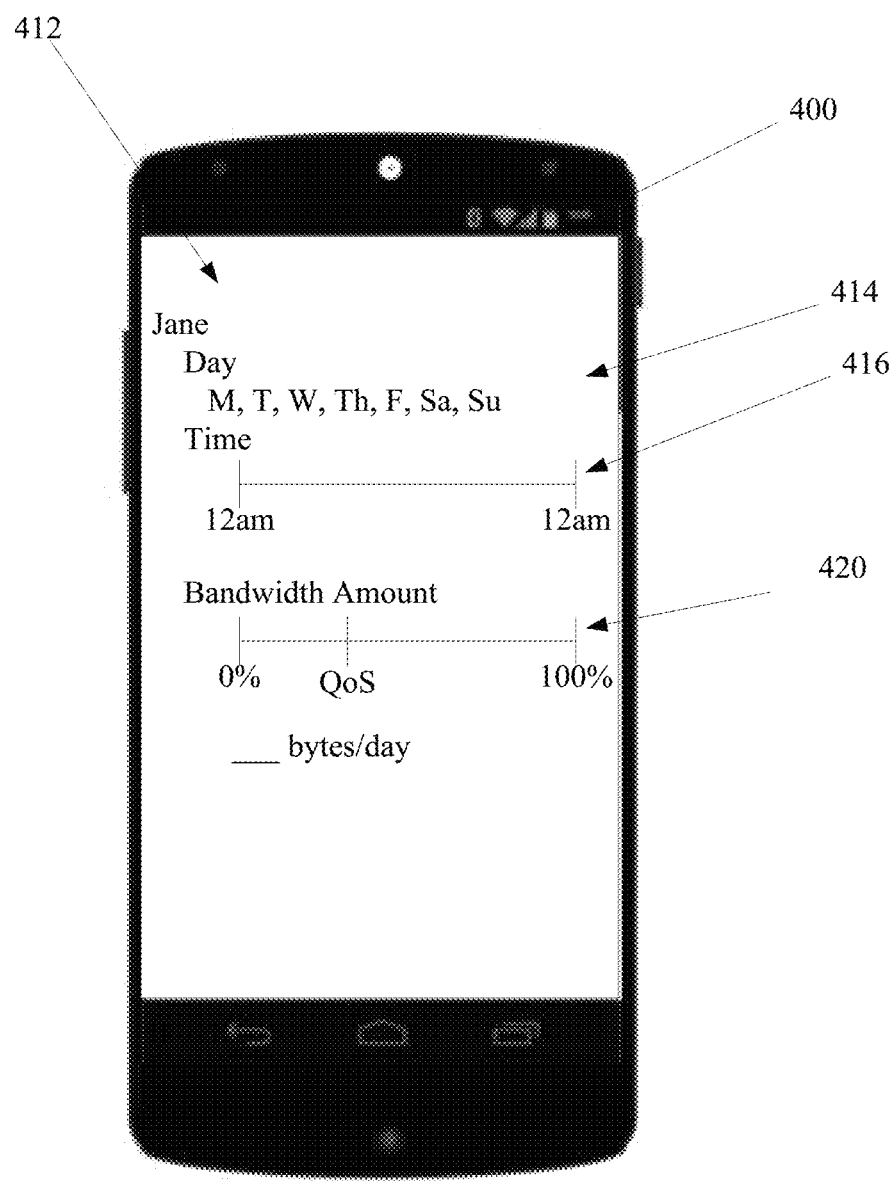

FIG. 4A shows a smartphone 400 presenting a first page 402 of a GUI produced by a processor executing a bandwidth allocation module stored in memory of smartphone 400. A user may elect how they wish to share bandwidth provided by their smartphone 400. In this example, the user may elect local bandwidth sharing or network sharing. Local sharing relates to process 200, shown in FIG. 2, and network sharing relates to process 300, shown in FIG. 3.

Once the user of smartphone 400 has selected the local bandwidth-sharing option from the first page 402 of the GUI, a first sharing GUI 408 is presented. In the first sharing GUI 408, the user is allowed to select what other devices or place a limit on the number of other devices with which he wishes to share the smartphone's bandwidth. The user is also allowed to share bandwidth of another device associated with the user. The user may select to share bandwidth with any device, devices associated with contacts stored in a contact list stored locally, or from a social network group. Also, the user may enter information of a new device. If the user selects to share with any device, the GUI 408 allows the user to place a limit on the number of other devices that are allowed access to the shared bandwidth.

If the user had selected the network (private) option, then a GUI similar to GUI 408 may be provided.

As shown in FIG. 4C, the user of the smartphone 400 has selected Jane from the local contacts using the GUI 408. This results in the presentation of a parameter-setting GUI 412. In the parameter-setting GUI 412, the user may select, at a section 414, the day or days of the week that the device associated with Jane has access to the bandwidth provided by the smartphone 400. The selection of days may be in other formats, such as monthly.

A second section 416 of the GUI 412 allows the user to farther limit bandwidth access based on time of day. The second section 416 may be a sliding scale. The user may select one or more windows of time (e.g., 8:00 a.m. to 9:00 a.m., 4:00 p.m. to 5:00 p.m.) using the sliding scale. Alternatively, a time per day value may be set by the user. For example, the user may select two hours per day that the device associated with Jane is provided with network access through the smartphone 400.

The GUI 412 further includes a bandwidth amount section 420. The bandwidth amount section 420 may include a sliding scale 422 for allowing a user to select a percentage of the total bandwidth access available to the smartphone 400. The sliding scale 422 may present a QoS mark that indicates when QoS to the smartphone 400 will begin to degrade if the user designates a higher percentage of the available bandwidth to provide to Jane's device. Alternatively, the user may enter an amount of data (uploaded or downloaded data) that Jane's device may transmit/receive per day (or other time designation).

Figure 4D:
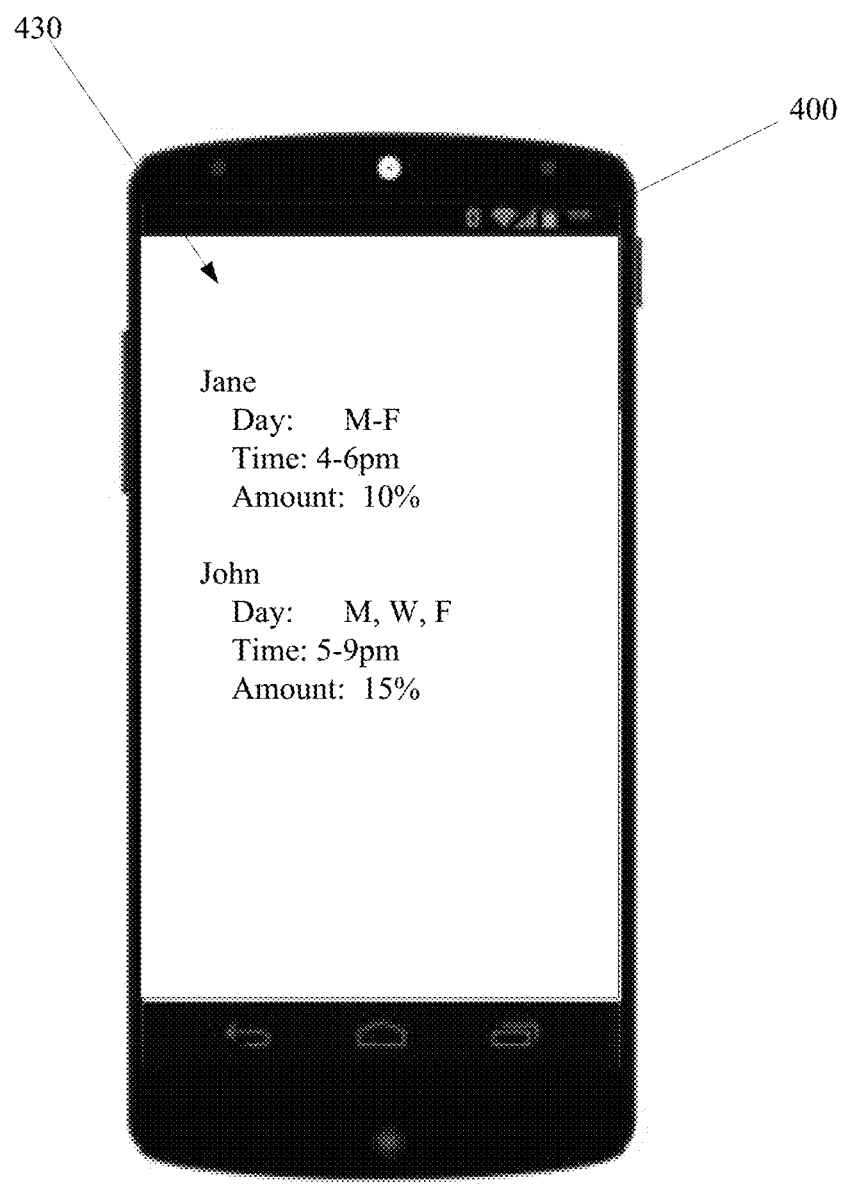

In FIG. 4D, a listing 430 of the type of bandwidth access the user has designated is shown. In this example, the user has allowed devices associated with Jane and John to get limited bandwidth access. Jane's device may have bandwidth access Monday through Friday between the hours of 4:00 and 6:00 p.m. The amount of access that Jane's device gets at those limited times is 10% of available bandwidth. John's device has different limitations.

Although various implementations have been described in language specific to structural features and/or methodological steps, it is to be understood that the appended claims are not limited to the specific features or steps described. Rather, the specific features and steps are disclosed as examples.

What is claimed is:

1. A computer-implemented method comprising:
   receiving one or more time parameters from a plurality of telecommunication devices;
   receiving one or more bandwidth parameters from the plurality of telecommunication devices;
   receiving, from an electronic device, a request for access to one or more networks;
   providing the electronic device with information for accessing a network using at least one telecommunication device of the plurality of telecommunication devices based at least on the one or more time parameters and the one or more bandwidth parameters;
   determining that the electronic device accesses the network using the at least one telecommunication device within a threshold period of time; and
   providing, in response to determining that the electronic device accessed the network within the threshold period of time, a credit to an account associated with the at least one telecommunication device.

2. The computer-implemented method of claim 1, wherein the one or more time parameters comprise at least one of one or more windows of time or a time value.

3. The computer-implemented method of claim 2, wherein individual ones of the one or more windows of time comprises a start time and an end time.

4. The computer-implemented method of claim 2, wherein the time value comprises an amount of time over a period of time.

5. The computer-implemented method of claim 1, wherein the one or more bandwidth parameters comprises at least one of an amount of bandwidth relative to a total amount of bandwidth available to a second device associated with a user of at least one of the plurality of telecommunication devices or an amount of one or more of transmitted or received data over a period of time.

6. The computer-implemented method of claim 1, wherein the providing the electronic device with information for accessing the network comprises allowing access to the network via at least one of a telecommunication connection or a connection with an internet service provider.

7. The computer-implemented method of claim 1, further comprising:
receiving location information from the plurality of telecommunication devices; and
receiving location information from the electronic device, wherein the providing the electronic device with information for accessing the network comprises providing the electronic device with the information based at least on the location information from the plurality of telecommunication devices and the location information from the electronic device.

8. A computing device comprising:
a processor; and
a memory device configured to store one or more instruction modules executable by the processor to:
receiving one or more time parameters from a plurality of telecommunication devices;
receiving one or more bandwidth parameters from the plurality of telecommunication devices;
receiving, from an electronic device, a request for access to one or more networks;
providing the electronic device with information for accessing a network using at least one telecommunication device of the plurality of telecommunication devices based at least on the one or more time parameters and the one or more bandwidth parameters;
determining that the electronic device accesses the network using the at least one telecommunication device within a threshold period of time; and
providing, in response to determining that the electronic device accessed the network within the threshold period of time, a credit to an account associated with the at least one telecommunication device.

9. The computing device of claim 8, wherein the request for access to the one or more networks includes at least one of location information of the electronic device, an amount of bandwidth, or a quality of service level indication.

10. The computing device of claim 8, wherein an amount of the credit provided to the account is based on an amount of bandwidth used by the electronic device.

11. The computing device of claim 8, wherein the request for access to the one or more networks includes an amount of bandwidth and the one or more instruction modules are further executable by the processor to:
determine that the at least one telecommunication device can not satisfy the amount of bandwidth;
provide the electronic device with additional information for accessing an additional network using an additional telecommunication device; and
determine that the electronic device accesses the network using the at least one telecommunication device and the additional network using the additional telecommunication device.

12. The computing device of claim 8, wherein the credit comprises at least one of a bandwidth credit, a time credit, a coupon, or a refund.

13. A system comprising:
a computing device comprising:
a processor; and
a memory device configured to store one or more instruction modules executable by the processor to:
receiving one or more time parameters from a plurality of telecommunication devices;
receiving one or more bandwidth parameters from the plurality of telecommunication devices;
receiving, from an electronic device, a request for access to one or more networks;
providing the electronic device with information for accessing a network using at least one telecommunication device of the plurality of telecommunication devices based at least on the one or more time parameters and the one or more bandwidth parameters;
determining that the electronic device accesses the network using the at least one telecommunication device within a threshold period of time; and
providing, in response to determining that the electronic device accessed the network within the threshold period of time, a credit to an account associated with the at least one telecommunication device.

14. The system of claim 13, wherein the request for access to the one or more networks includes at least one of location information of the electronic device, an amount of bandwidth, or a quality of service level indication.

15. The system of claim 13, wherein an amount of the credit provided to the account is based on an amount of bandwidth used by the electronic device.

16. The system of claim 13, wherein the request for access to the one or more networks includes an amount of bandwidth and the one or more instruction modules are further executable by the processor to:
determine that the at least one telecommunication device can not satisfy the amount of bandwidth;
provide the electronic device with additional information for accessing an additional network using an additional telecommunication device; and
determine that the electronic device accesses the network using the at least one telecommunication device and the additional network using the additional telecommunication device.

17. The system of claim 13, wherein the credit comprises at least one of a bandwidth credit, a time credit, a coupon, or a refund.

18. The system of claim 13, wherein the one or more time parameters comprise at least one of one or more windows of time or a time value.

19. The system of claim 18, wherein individual ones of the one or more windows of time comprises a start time and an end time.

20. The system of claim 18, wherein the time value comprises an amount of time over a period of time.

* * * * *